Dec. 30, 1930.  G. E. EVANS  1,786,904
COTTON BOLL EXTRACTING AND CLEANING DEVICE
Filed Oct. 25, 1929    2 Sheets-Sheet 1

Inventor
George E. Evans

Dec. 30, 1930.  G. E. EVANS  1,786,904
COTTON BOLL EXTRACTING AND CLEANING DEVICE
Filed Oct. 25, 1929    2 Sheets-Sheet 2
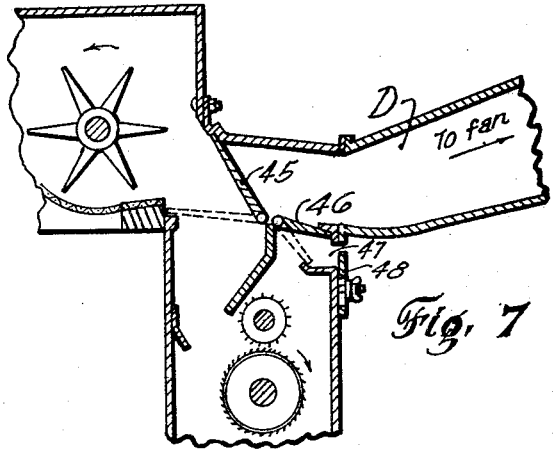
Fig. 7
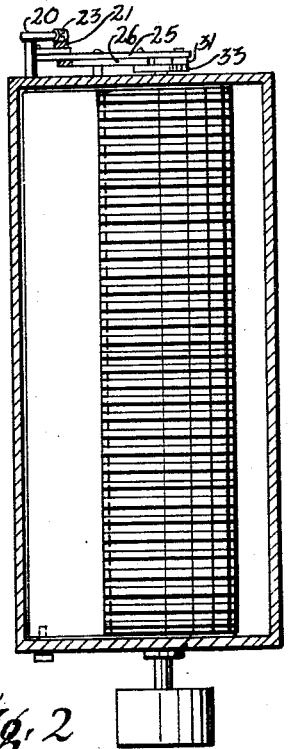
Fig. 2
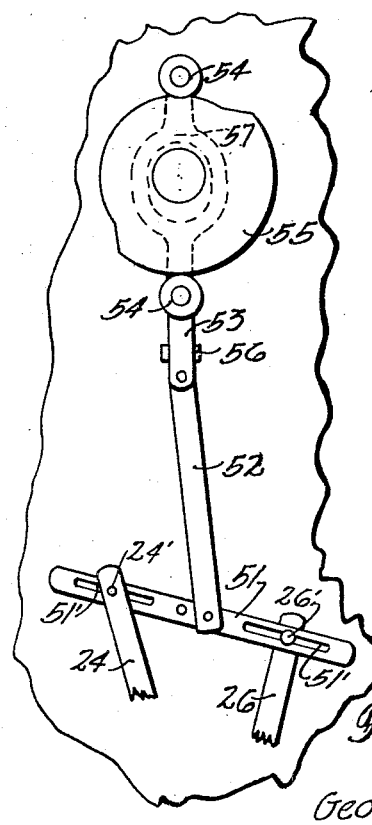
Fig. 8
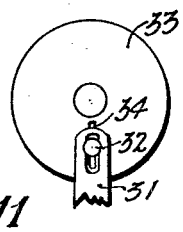
Fig. 11
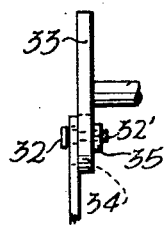
Fig. 10
Fig. 9
Inventor
George E. Evans
By Jack Athley
Attorney Patented Dec. 30, 1930

1,786,904

UNITED STATES PATENT OFFICE

GEORGE E. EVANS, OF NEAR WACO, TEXAS

COTTON-BOLL EXTRACTING AND CLEANING DEVICE

Application filed October 25, 1929. Serial No. 402,449.

This invention relates to new and useful improvements in cotton boll extracting and cleaning devices.

The object of the invention is to provide a device adapted for receiving cotton and cotton bolls from the usual boll breaking machine or adapted to be connected in the air suction line leading to a cotton gin stand and arranged to extract burs from the cotton bolls as well as dirt and other extraneous matter in an improved and efficacious manner.

A particular object of the invention is to provide means at the entrance of the device, whereby separate lanes are provided on opposite sides of the cotton engaging elements; one of the lanes is for receiving and carrying the cotton and cotton burs to the engaging elements and also conducting the burs and extraneous matter from the device; while the other lane is connected in the air suction line providing an air current which acts to doff the cotton and conduct it to a point of discharge.

A further object of the invention is to provide a device of the kind whereby the cotton and cotton burs are fed to the cleaning elements by gravitation and with the cotton being delivered from the device by an air current in an air suction line.

Another object of the invention is to provide means within the feed lane cooperating with the saws of the cotton engaging elements to deflect the cotton and cotton burs into engagement with said saws.

A further object of the invention is to provide adjustable means for alternately opening and closing the deflecting means in the feed lane, thus allowing the burs to pass through a series of engagements with the cotton extracting elements and assuring a complete separation of the cotton from the burs, dirt, etc.

A still further object of the invention is to provide means for varying the duration of time the alternate deflecting means remain open or closed, whereby the varying actions of the extracting and cleaning elements upon the different grades and conditions of cotton may be met and cared for, thus assuring an efficient and convenient device.

A construction designed to carry out the invention will be hereinafter described together with other featues of the invention.

Figure 1:
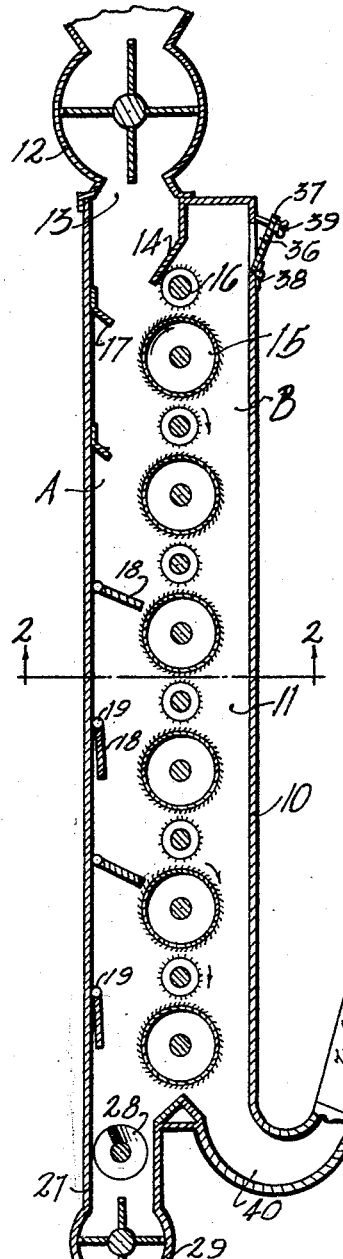
Figure 6:
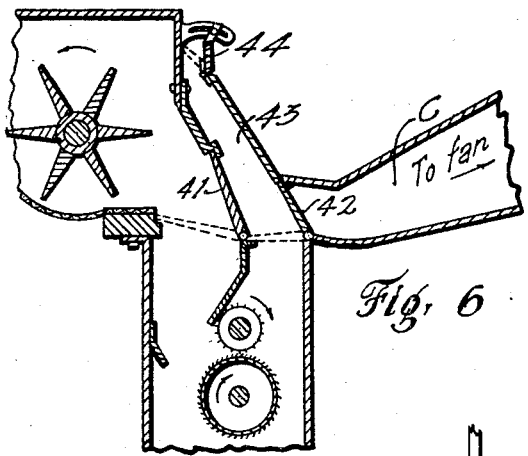
Figures 3, 4, 5:
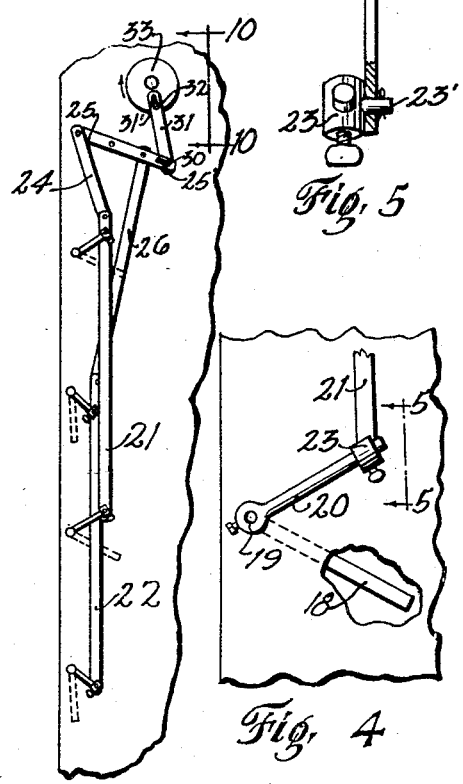

The invention will be more readily understood from a reading of the following specification and by reference to the accompanying drawings in which an example of the invention is shown, and wherein:

Figure 1 is a longitudinal and vertical sectional view of a device constructed in accordance with the invention, Figure 2 is a transverse sectional view taken on the line 2—2 of Figure 1, Figure 3 is a sectional view showing the baffle control means, Figure 4 is a detail view of the baffle adjusting means, Figure 5 is a detailed view taken on the line 5—5 of Figure 4, Figures 6 and 7 are sectional views showing alternate forms of connecting the device in an air suction line, Figure 8 is a partial vertical sectional view showing an alternate form of opening and closing the feed lane, Figure 9 is a partial view of an alternate form of baffle control means, Figure 10 is a detailed view of the time adjusting means taken on the line 10—10 of Figure 3, and Figure 11 is a detailed front view of the same.

In the drawings the numeral 10 designates an elongated housing having end walls 11. At the entrant end a suitable hopper 12 may be connected to a reduced opening 13 at one side of the housing, through which the cotton and cotton burs enter said housing. A deflector or barrier 14 is inclined toward the opening and serves to deflect the cotton to one side of the housing.

Transversely mounted saw members or drums 15 are disposed longitudinally of the housing in alternate relation to picker rollers 16. These parts 15 and 16 constitute a series of cotton treating elements and it will be noted that the drums and rollers are imperforate and are in such relation as to form a vertical barrier or divider between the sides of the housing, thereby producing opposite lanes A and B therein.

The lane A is a bur lane and is located on the same side as the opening 13 through which the cotton and cotton burs enter the housing. Two deflectors 17 are mounted transversely of the housing in the lane A and are located opposite the two upper saw drums and their picker rollers for deflecting the cotton into contact therewith. For deflecting the cotton and feeding it to the remaining cleaning elements, baffles 18 are pivotally mounted transversely of the housing and opposite their respective saw drums and picker rollers.

The baffles are mounted on shafts 19 which are pivoted in the ends of the housing with one end of the shafts extending through one end of said housing for the mounting thereon of adjusting arms 20. The alternate adjusting arms 20, as shown in Figures 3, 4 and 5, have their ends pivotally connected to relative shifting bars 21 and 22 by adjustable collars 23 which have protruding therefrom tongues 23' pivoted in said bars 21 and 22.

The bar 21 is connected by a link 24 to one end of a bell crank lever 25 that is pivoted to the end of the housing, while the bar 22 has a longer link 26 connecting it to the opposite end of said lever. As can thus be seen the reciprocation of the lever 25 shifts the bars 21 and 22 alternately in opposite directions to each other, thereby raising and lowering the alternate baffles, thus opening and closing the feed lane.

When the lane is closed the cotton and cotton burs are fed to the saws by gravitation upon the raised baffles which are inclined toward the saws. The revolving picker rollers repel the burs and cause the cotton and burs to form a roll which enables the saws to better engage the cotton fibre. The lowering of the baffles allows the remaining cotton and burs to fall or gravitate to the next baffle which is in a raised position, thereby subjecting the cotton to further cleaning and separation from the burs. Likewise the above operation is repeated upon the continued raising and lowering of the alternate baffles until the burs have passed the last cleaning element.

At the discharge end or bottom of the housing a hopper 27 depends from the bur lane and has mounted therein a conveyor 28 which deposits the burs and dirt in a vacuum gate 29, located at the discharge end of the conveyor, from which said burs and dirt are discharged. For actuating the lever 25 a slot 25' is provided in one end for receiving a pin 30 of a link 31. The opposite end of said link is also provided with a similar slot 31' for receiving a pin 32 eccentrically mounted on a wheel 33. Said wheel may be mounted on the housing and driven in any suitable manner.

As the wheel 33 begins to revolve from the position shown in Figure 3, the pin 32 will move in an upward position and will ride in the slot 31' until the end thereof is reached at which point the link 31 is also raised bringing into play the pin 30 which rides in the slot 25' until the end thereof is also reached, thereby raising the slotted end of the lever 25 and lowering the opposite end thereof, thus lowering the bar 21 by means of the connecting link 24 and raising the bar 22 by means of the connecting link 26 until the pin 32 is at the top of the wheel 33 at which point the baffles are in a position opposite that shown in Figure 3. As the wheel continues rotating and the pin starts on its downward movement the play of both pins 32 and 30 in their respective slots 31' and 25' allows the baffles to remain stationary until the play is taken up by the movement of said pins, thereby making constant the period of time the baffles remain open and closed to the passage of the cotton and burs.

As shown in Figures 10 and 11 the pin 32 is headed and has a reduced end 32' for extending through a slot 34 of the wheel 33 and receiving thereon an adjusting nut 35, thus providing for the variance of time in which the baffles remain open and closed, as the pin may be adjusted toward or from the center of the wheel thereby shortening or lengthening the radius of said pin's rotation. Obviously the continued rotation of the wheel 33 will continuously alternate the open and closed position of the baffles as hereinbefore explained.

The adjustable collars 23 on the arms 20 provide for adjustable inclined positions of the baffles for meeting the different conditions of cotton that enters the device, thus assuring the complete separation of the dirt and burs from the cotton and greater efficiency of the device. At the top or entrant end of the device and on the side opposite the opening 13 an air duct 36 extending the width of the device is provided through which air will enter to the lane B. For regulating the amount of air entering through said duct a gate 37 is hinged at one side thereof with spring hinges 38 and positioned by an adjusting screw 39.

At the bottom and discharge end of the housing a discharge spout 40 leads from the lane B and is connected in an air line or to a suction fan (not shown) so as to create an air current in the lane B for doffing the cotton from the saw teeth and conducting the same from the device.

In operating the device the cotton is removed from the wagon or other storage in the usual manner by means of an air suction conveyor or flue. After passing through the usual boll breaker (not shown), which will crack open the bollie cotton, the cotton and burs are conducted to the hopper 12 and the opening 13 at the entrance of the device. The movable parts of the device are driven in any suitable manner. As the cotton and cotton burs enter the device through the opening they are diverged to one side in the lane A.

The cotton and burs falling by gravitation in the lane A are deflected into engagement with the saw teeth of the drums 15 by the deflectors 17 and the baffles 18. The drums 15 and the picker rollers 16 being rotated in a clockwise direction will pick up the cotton and repel the burs. The cotton is carried into the lane B and doffed from the saw teeth by the air currents. The burs and extraneous matter being cast away from the cotton by the picker rollers, will pass downward in the lane A and by the baffles as they are lowered. It is pointed out that any air currents entering the device through the opening 13 will travel from the lane A to the lane B in a direction substantially tangential to the tops and bottoms of the drums.

Each successive drum and picker roller will repeat the separating operation until all of the cotton and burs are separated. The cotton will pass out through the spout 40 with the air current from the lane B. The burs, dirt, bits of rock and other extraneous matter will pass into the hopper 27. The conveyor 28 will carry this material to the gate 29 which will discharge it.

If the material is passing too rapidly by the saws or is being unnecessarily retarded, the operator merely has to readjust the collar 23 on the arm 20 to change the inclination of the baffles. The pin 32 may also be readjusted on the wheel 33 for either shortening or lengthening the time that the baffles remained closed or open. In this manner the device is made to meet all the differences that may arise from the varying conditions of cotton.

As is shown in Figure 6 the device may be connected in an air suction line C in conjunction with other types of boll breakers, by employing gates 41 and 42 at the entrant end of the device. The gates 41 and 42 are pivoted so that when they are in an open position (as shown in full lines) they will be transversely of the air suction line thus closing it. The gate 41 will thereby deflect the cotton and burs downwardly into the device and also in conjunction with the gate 42 form a throat 43 through which an air current will enter the device from a gate 44 located at the mouth of said throat. When the gates are in a closed position (as shown in dotted lines) the device may be by-passed by cotton passing through the air suction line.

Figure 7 also shows another form of mounting the device for use in an air suction line D. Swinging gates 45 and 46 are mounted at the entrant end of the device with their apexes in close relation. The gate 45 when in an open position (as shown in full lines) transversely crosses the air suction line D, thus closing said line and deflecting the cotton and burs into the device, while the gate 46, when in an open position (as shown in full lines) closes an air intake 47 to the suction line D and deflects the air currents into the device. A vertical adjustable gate 48 at the mouth of the intake regulates the quantity of air currents entering therein. When the gates are in a closed position (as shown in dotted lines) the cotton by-passes the device and the air currents are deflected into the suction line D.

An alternate form of opening and closing the lane A (Figure 8) has baffles 49 extending transversely of the device and pivotally mounted with their apexes adjacent the saw drums. Deflectors 50 are also mounted transversely of the housing for partially deflecting the cotton and burs into the cleaning elements when the baffles are in an open position and for forming the upper portion of an inclined shelf to the cleaning elements when the baffles are in a closed position. The baffles may be alternately opened and closed as hereinbefore explained.

An alternate form for actuating the shifting bars 21 and 22 (Figure 9) has the upper end of the links 24 and 26 provided with pins 24' and 26' which slide in slots 51' of a lever 51 pivoted at the center to the housing. A link 52 is pivoted at one end to the lever and is pivoted at the opposite end to a vertical bar 53. The bar carries rollers 54 which are mounted on a cam 55 carried on any suitable drive shaft, such as 16', for supporting the bar 53 and vertically reciprocating the same between guide arms 56. The bar 53 has an elongated eye 57 for mounting over the drive shaft. Obviously the rotation of the cam 55 will cause the bar to reciprocate thus rocking the lever 51 through connection of the link 52, and shifting the baffles as hereinbefore explained.

Various changes in the size and shape of the different parts, as well as modifications and alterations, may be made within the scope of the appended claims.

What I claim, is:

1. In a cotton boll extracting and cleaning device, a vertical housing, means at the upper end of the housing for dropping bur-cotton out of an air line into the housing, a vertical train of revolving cotton extracting elements dividing the housing into bur and cotton lanes extending from the top to the bottom of said housing, deflectors hinged in the bur lane of the housing, links connected to alternate deflectors for swinging them, a lever pivoted intermediate its ends and connected to said links at opposite sides of its pivot, and a cam controlled connection for oscillating said lever.

2. In a cotton boll extracting and cleaning device, a vertical housing, means at the upper end of the housing for feeding bur-cotton from an air line thereto, a train of revolving cotton extracting elements comprising saw members rotatable toward the feed and oppositely movable picker members having their axes in substantially the same vertical plane as said members, thus forming bur and cotton lanes extending from the top to the bottom of the housing, automatically shiftable deflectors in the bur lane each opposite a different saw member, and means for feeding from one deflector and saw member to that next below during the passage of the burs and cotton through the housing.

3. The combination as defined by claim 2, with an air inlet at the upper end of the cotton lane, and an air suction for discharge at the bottom of said cotton lane to produce a down draft therein independent of the bur lane.

4. In a cotton boll extracting and cleaning device, a vertical housing, revolving saw drums mounted one above the other in the housing, picker rollers mounted wholly between the drums, the drums and rollers constituting a vertical barrier and dividing the housing into vertical bur and cotton lanes, the cotton lane of the housing being free and unobstructed, and means in the bur lane for cascading the burs and cotton downwardly from one drum to the next drum.

5. In a cotton boll extracting and cleaning device, a vertical housing divided into vertical bur and cotton lanes, vertically spaced revolving saw drums mounted in the housing between the lanes, picker rollers mounted between the drums, mechanical means for closing the bur passage opposite some of the drums, and an actuator for said mechanical means for alternately operating the same, whereby the bur passage opposite alternate drums is closed when the bur passage opposite adjacent drums is opened and vice versa.

6. In a cotton boll extracting and cleaning device, a train of cotton treating elements therein all of which are disposed with their axes in substantially the same vertical plane thus dividing the housing into a cotton lane and a bur lane and including a plurality of toothed members operating in the direction of the feed thereto, deflectors in the bur lane of the housing each cooperating with a different toothed member, means for automatically shifting said deflectors toward and from alternate members to effect a step by step movement of the burs and cotton through said lanes, means for adjusting each deflector comprising an arm thereon, and a longitudinally movable rod adjustable upon said arm to vary the duration of the step by step periods.

In testimony whereof I affix my signature.

GEORGE E. EVANS.